United States Patent

Ogawa

Patent Number: 5,663,627
Date of Patent: Sep. 2, 1997

[54] CONTROL APPARATUS FOR CONTROLLING MOTOR OF AIR CONDITIONER

[75] Inventor: Yoshio Ogawa, Tokyo, Japan

[73] Assignee: Fujitsu General Limited, Japan

[21] Appl. No.: 419,737

[22] Filed: Apr. 10, 1995

[30] Foreign Application Priority Data

Jul. 26, 1994 [JP] Japan .................. 6-193663

[51] Int. Cl.⁶ ........................................... H02P 5/34
[52] U.S. Cl. ..................... 318/803; 318/811; 363/37; 363/132
[58] Field of Search ..................... 318/792–811; 363/34–41, 95, 98, 131, 135, 127, 132

[56] References Cited

U.S. PATENT DOCUMENTS

| | | | |
|---|---|---|---|
| 4,417,193 | 11/1983 | Hirata | 318/803 |
| 4,876,637 | 10/1989 | Mose et al. | 318/811 X |
| 4,996,470 | 2/1991 | Rowan et al. | 318/772 |
| 5,047,909 | 9/1991 | Hosoda | 318/806 X |
| 5,070,290 | 12/1991 | Iwasa et al. | 318/758 |
| 5,225,712 | 7/1993 | Erdman | 290/44 |
| 5,373,195 | 12/1994 | De Donker et al. | 307/45 |
| 5,460,244 | 10/1995 | Tanahashi | 318/802 X |

*Primary Examiner*—David S. Martin
*Attorney, Agent, or Firm*—Adams & Wilks

[57] ABSTRACT

A control apparatus for controlling a motor of an air conditioner includes a converter, having switching for improving an input power factor, for converting an AC power to a DC power and an inverter for converting the DC power supplied from the converter to the AC power and supplying to a compressor. The output DC voltage of the converter is detected by a DC voltage detecting circuit. An input alternating current is detected by a current detecting circuit. A microcomputer for controlling the inverter calculates a current command from data stored on the basis of the detected voltage. The detected current is compared with the current command, an ON percentage of a PWM signal to control the switching is obtained, and the PWM signal is generated.

6 Claims, 9 Drawing Sheets

● ; MEMORY DATA (IM0∼IM9;IMn)

○ ; CURRENT COMMAND (IS0∼IS9;ISn)

CONTROL APPARATUS FOR CONTROLLING MOTOR OF AIR CONDITIONER

FIELD OF THE INVENTION

The present invention relates to a control apparatus for controlling a motor of an air conditioner and, more particularly, to a control apparatus for controlling a motor of an air conditioner in which an inverter is controlled by a single microcomputer and a converter to obtain a DC voltage which is necessary for an inverter circuit to be controlled.

DESCRIPTION OF THE RELATED ART

Hitherto, an air conditioner has inverter control means for controlling a compressor, converts a commercial AC power into a DC power, and converts the converted DC voltage into the arbitrary AC voltage by the inverter control means, thereby supplying it to the compressor. As converting means for converting the AC power into the DC power, a converter of a capacitor input type is generally used. However, since an inputted alternating current waveform from the AC power is a distorted wave, the input power factor is low and a harmonics current is generated. Therefore, a convertor for converting the input current waveform to almost a sine wave has been proposed.

An example of such an air conditioner will now be explained in detail with reference to FIG. 8. The air conditioner comprises: a converter circuit 2 to convert a commercial AC power 1 into a DC power; an inverter circuit 4 to convert the output DC voltage of the converter circuit 2 into a predetermined AC voltage and supply it to a compressor 3; a microcomputer 6 for outputting inverter control signals (PWM signal) to on/off control a plurality of transistors 4a as switching means of the inverter circuit 4 and for executing input/output operations of signals from/to various input/output circuits 5 which include a zero-cross detecting circuit for detecting a zero-cross point of an input AC which is used for judging a frequency of the input AC and for transmission/reception of signals between an indoor apparatus and an outdoor apparatus and the like and which are necessary to control the air conditioner; a converter control circuit 7 for outputting an IGBT control signal (PWM signal) according to an input current (rectified current) in the converter circuit 2, an input voltage (rectified voltage), and an output voltage, and for on/off driving an IGBT 2a as switching means; and an inverter driving circuit 8 for inputting an inverter control signal and for on/off driving the transistors 4a.

In addition to the IGBT 2a, the converter circuit 2 comprises: a rectifying circuit 2b for rectifying a commercial AC power to a direct current; a reactor 2c; a diode 2d for blocking reverse current; and a smoothing capacitor 2e.

Further, the converter control circuit 7 has a current detecting circuit, two voltage detecting circuits, an IGBT driving circuit, an oscillating circuit, an exclusive-use IC for controlling the converter, and the like. The converter control circuit 7 detects a current by using a current sensor 7a, detects a voltage waveform obtained by rectifying an AC voltage, and also detects an output DC voltage. A control signal (PWM signal) to control the IGBT 2a of the converter circuit 2 is generated so that the input AC current waveform from the AC power becomes a sine wave in accordance with the detected current and voltages.

Figure 9:
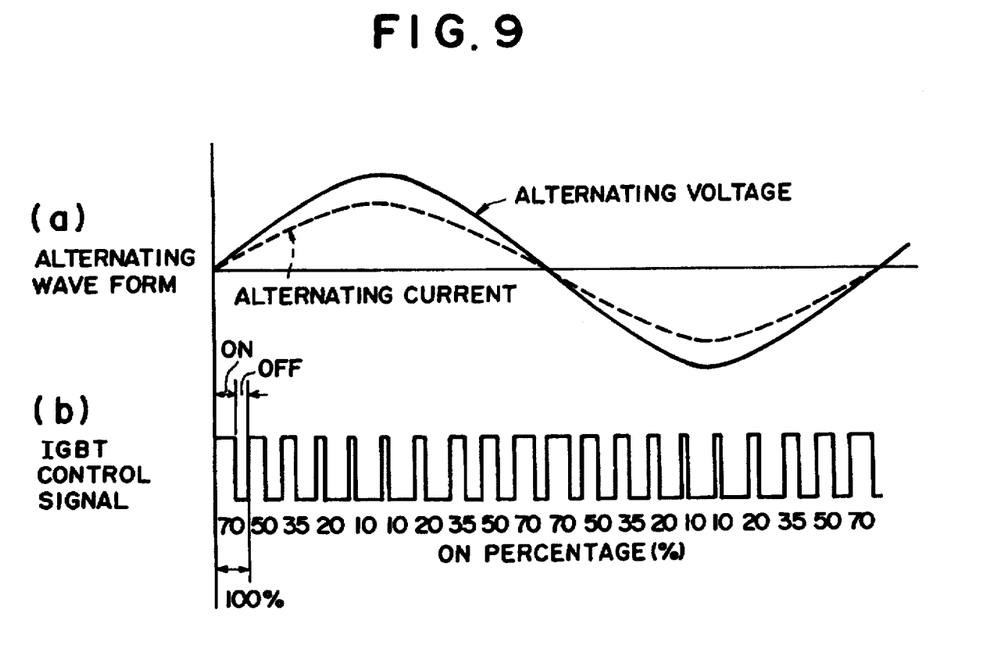
FIG. 9 is a timing chart used for explaining the operation of the control apparatus shown in FIG. 8.

As shown in FIG. 9, for example, the converter control circuit 7 generates the IGBT control signal [shown in FIG. 9(b)] to turn on/off the IGBT 2a so that the input AC current waveform of the converter circuit 2 is set to approximate a sine wave. Consequently, as shown in FIG. 9(a), since the input AC current from the AC power doesn't become a distorted wave, the input power factor can be improved and a harmonics wave doesn't occur.

However, such an air conditioner needs two control means such as microcomputer 6 and converter control circuit 7 in order to PWM control switching means of the inverter circuit 4 and converter circuit 2. Therefore, there are problems such that not only a circuit configuration is complicated but also the number of parts is large, so that the costs are raised and the reliability is deteriorated.

SUMMARY OF THE INVENTION

It is an object of the invention to provide a control apparatus for controlling a motor of an air conditioner in which an inverter control is executed by single control means that also controls a converter used to obtain a DC voltage which is necessary for the inverter circuit to be controlled.

A control apparatus for controlling a motor of an air conditioner according to the invention comprises: a converter for converting an AC power into a DC power; an inverter for converting the DC power into AC power and supplying it to a compressor; and a microcomputer for controlling the inverter and for controlling switching means included in the converter so as to improve an input power factor, wherein the control apparatus further includes current detecting means for detecting an input current from the AC power, voltage detecting means for detecting an output DC voltage of the converter, and comparing means for comparing the detected DC voltage and a predetermined DC voltage, and wherein the microcomputer includes means for obtaining a current command by calculating or selecting said current command from data in the microcomputer or data stored in external memory means on the basis of a comparison result of the comparing means, comparing the current command with the detected input current, obtaining an ON percentage of a PWM signal to control the switching means, outputting the PWM signal, and controlling the switching means.

With such a construction, when the output DC voltage of the converter means is changed due to a fluctuation of a load or the like, the current command is varied in accordance with it. On the other hand, by comparing the current command and the input alternating current, the ON percentage of the PWM signal to control the switching means is calculated and varied and outputted. The switching means is driven by the PWM signal. Thus, the output DC voltage of the converter means is maintained at a predetermined necessary value (predetermined DC voltage) and the input current is set to an approximate sine wave. Since the switching means of the converter and the switching means of the inverter are PWM controlled by the single microcomputer, a circuit construction is simplified, the number of parts can be reduced, the costs can be decreased, and the reliability can be improved.

According to the apparatus, the converter for converting the AC power to the DC power of the inverter is controlled by using the timer function, memory function, and arithmetic operating function of the microcomputer to inverter control the compressor, so that the air conditioner can be controlled by a single control means. The input current is set to a sine wave, the power factor is improved, the harmonics current is suppressed, and the output DC voltage (power source of the inverter) of the converter can be held constant,

DESCRIPTION OF THE PREFERRED EMBODIMENT

A control apparatus for controlling a motor of an air conditioner according to the invention detects an input current from an AC power, detects an output DC voltage of a converter, and compares the detected DC voltage and a predetermined voltage. A microcomputer of the control apparatus obtains a current command by calculating or selecting from data in the microcomputer or data stored in external memory means on the basis of the comparison result, compares the current command with the detected input current, obtains an ON percentage of a PWM signal to control a switching device of a converter circuit, outputs the PWM signal, and controls the switching device.

A construction of the control apparatus will now be described in detail with reference to FIG. 1. In the diagram, the same and corresponding portions as those in FIG. 8 are designated by the same reference numerals and their over-lapped descriptions are omitted.

Figure 1:
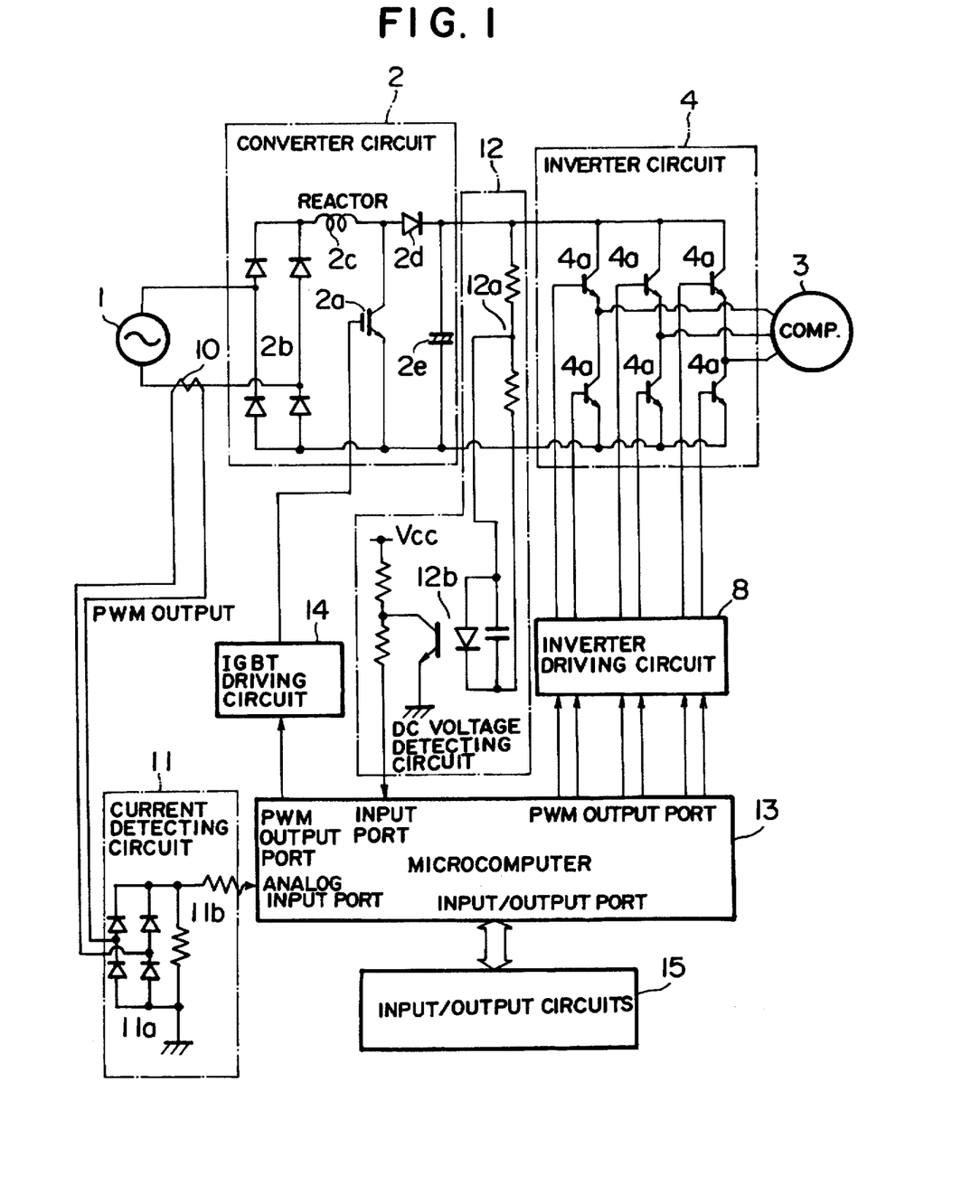
FIG. 1 is a schematic block diagram of a control apparatus for controlling a motor of an air conditioner showing the first embodiment of the invention.
Figure 8:
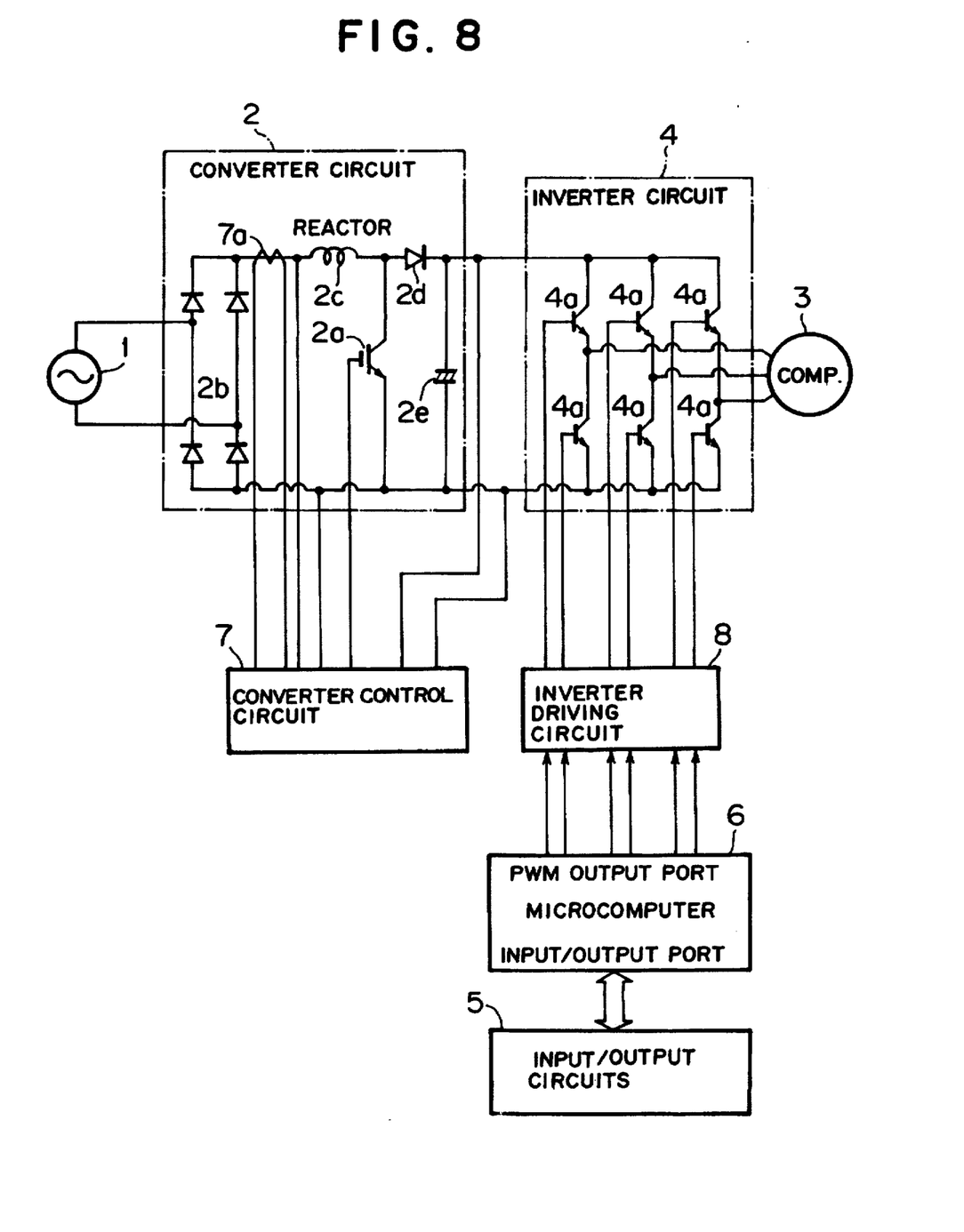
FIG. 8 is a schematic block diagram of a control apparatus for controlling a motor of a conventional air conditioner.

In FIG. 1, the control apparatus comprises: a current sensor (CT) 10 and a current detecting circuit 11 for detecting an input alternating current of the converter circuit 2; a DC voltage detecting circuit 12 for detecting an output DC voltage of the converter circuit 2; a microcomputer 13 for outputting a control signal (PWM) signal to on/off control the IGBT (transistor) 2a included in the converter circuit 2 by varying as desired an ON percentage in addition to a function [function to output an inverter control signal (PWM signal) or the like] of the microcomputer 6 shown in FIG. 8; and an IGBT driving circuit 14 for on/off driving the IGBT 2a by the PWM signal.

The current detecting circuit 11 comprises a rectifying diode 11a and a resistor circuit 11b and converts an input AC waveform detected by the current sensor 10 to a compatible input level (voltage value) of the microcomputer 13. In the embodiment, although reference numeral 11a denotes a full-wave rectifying circuit, a half-wave rectifying circuit can be also used. The DC voltage detecting circuit 12 comprises: a voltage dividing resistor circuit 12a for step- ping down the output DC voltage of the converter circuit 2; and a photocoupler circuit 12b for insulating the stepped-down analog value and converting to the digital value (H, L) and outputting to the microcomputer 13.

A voltage division ratio of the voltage dividing resistor circuit 12a is set in a manner such that an output of the photocoupler circuit 12b is set to the H level in the case where the output DC voltage of the converter circuit 2 is smaller than a voltage value (set DC voltage; for example, 300V) necessary for the inverter circuit 4 to drive the compressor 3 and that the output of the photocoupler circuit 12b is set to the L level in the case where the output DC voltage is larger than the set voltage value. Namely, the set output DC voltage is compared with the detected output DC voltage of the converter circuit 2 and the comparison result is outputted as an H level or an L level.

A zero-cross detecting circuit to detect a zero-cross point of the input AC voltage is included in the input/output circuit 5. A detected zero-cross detection signal is outputted to the microcomputer 13. The zero-cross detection signal is used for judgment of a frequency of an input alternating current or transmission and reception of signals between an indoor apparatus and an outdoor apparatus in the conventional apparatus.

The operation of the control apparatus with the above construction and a function of its control method will now be described with reference to timing charts of FIGS. 2, 6, and 7, graphs of FIGS. 3 and 4, and flowcharts of FIGS. 5A and 5B.

The microcomputer 13 executes input and output controls necessary for control of the air conditioner and inverter controls the compressor 3. In the case where the input AC waveform is as shown in FIG. 2(a), the current detecting circuit 11 detects an AC waveform shown by a solid line in FIG. 2(d). The detected AC waveform is converted to the voltage by resistor divider network 11b and outputted to an analog input port of the microcomputer 13.

Figure 2:
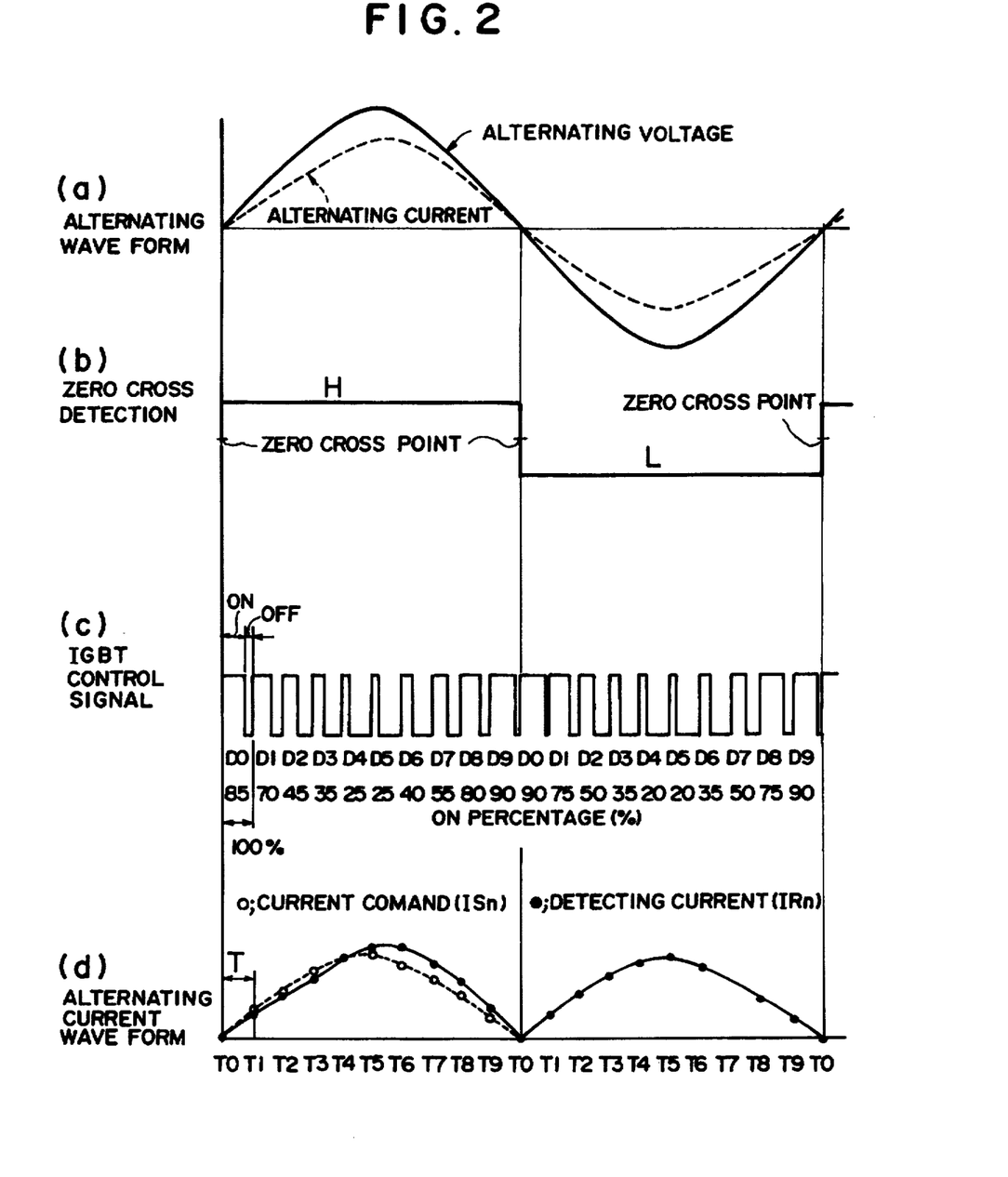
FIG. 2 is a timing chart used for explaining the operation and control method of the control apparatus shown in FIG. 1.
Figure 3:
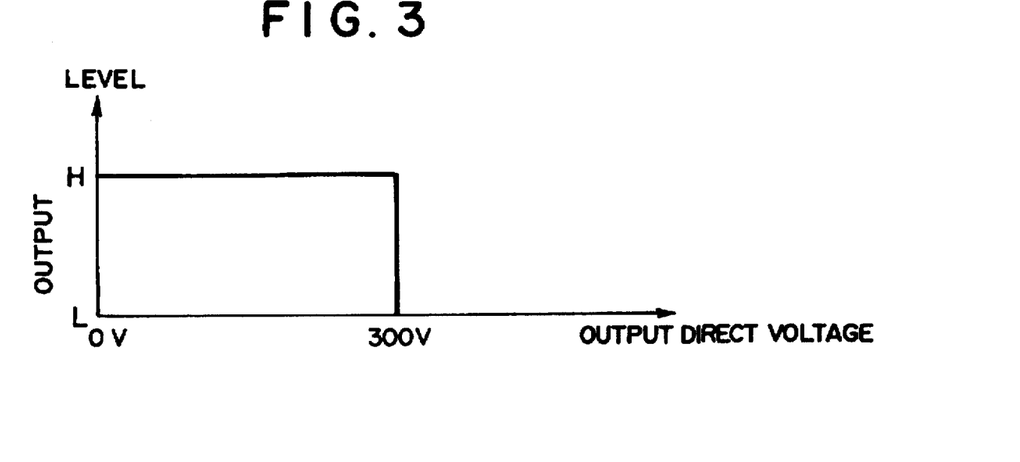
FIG. 3 is a graph used for explaining the operation of the control apparatus shown in FIG. 1.

In this instance, the microcomputer 13 detects a leading edge and a trailing edge of the zero-cross detection signal [shown in FIG. 2(b)] from the input/output circuit 5 and detects the zero-cross point of the input AC voltage. The microcomputer 13 also detects outputs IR0 to IR9 (IRn) of the current detecting circuit 11 at every predetermined time T in the half period of the input AC voltage from the zero-cross detection [shown in FIG. 2(d)] and stores in an internal or external memory (for example, internal RAM) [shown in IRn in Table 1:IR0 to IR9].

On the other hand, the DC voltage detecting circuit 12 detects the output DC voltage of the converter circuit 2 for converting the commercial AC power 1 to the DC power and compares it with the predetermined voltage and outputs an H-level or L-level signal as a comparison result to an input port of the microcomputer 13. For example, as shown in FIG. 3, when the output DC voltage of the converter circuit 2 is smaller than the set voltage 300 V, the output level of the DC voltage detecting circuit 12 is set to the H level. When the output DC voltage of the converter circuit 2 is larger than 300 V, the output of the DC voltage detecting circuit 12 is set to the L level.

The microcomputer 13 stores data (IM0 To IM9: IMn) shown in Table 1 in an internal or external memory (for example, internal ROM), calculates current commands IS0 to IS9 (shown in Table 1: ISn) by the data IMn and the output level (comparison result) of the DC voltage detecting circuit 12, and stores in an internal or external memory (for example, internal RAM).

Figure 4:
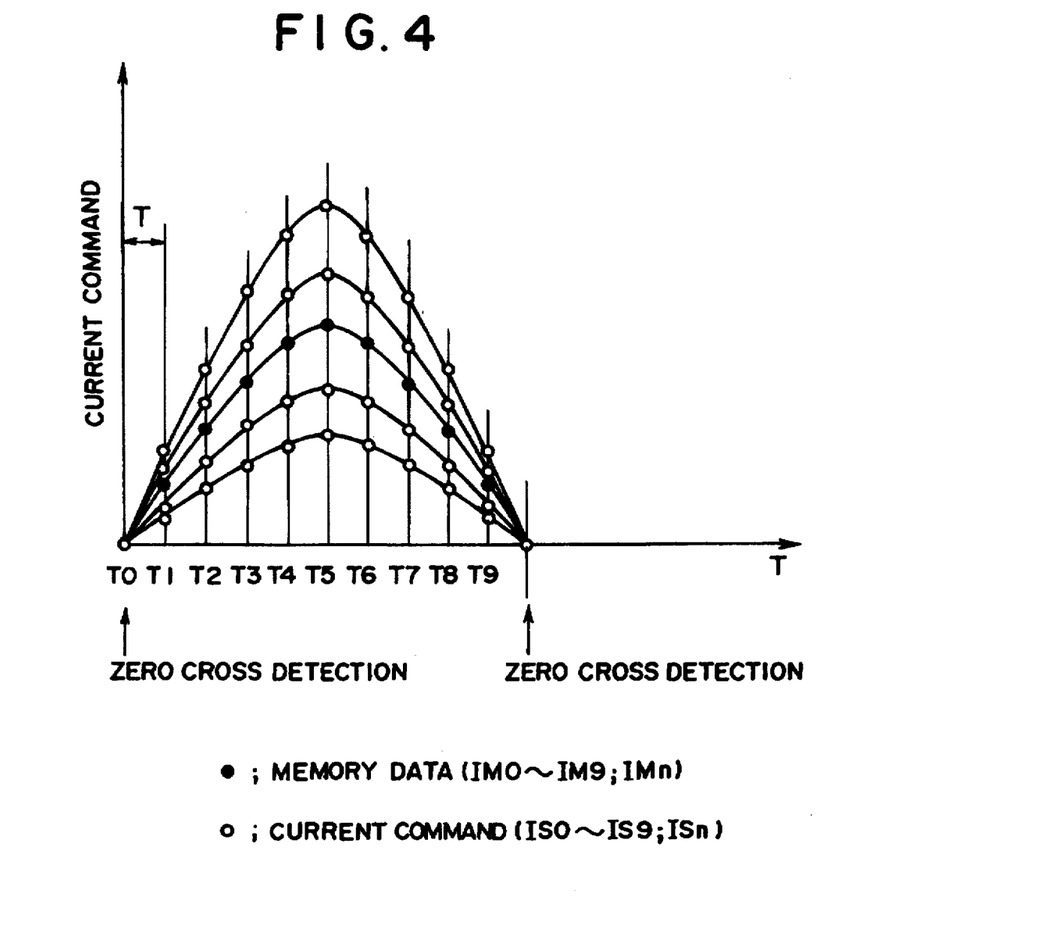
FIG. 4 is a graph used for explaining the operation of the control apparatus shown in FIG. 1.

As shown in FIG. 4, the data of IMn (IM0 to IM9) is sine wave data corresponding to the half period of the input alternating current of every predetermined time T from the zero-cross point. (n) denotes an integer. As IMn, data corresponding to ¼ period of IM0 to IM5 can be also used.

For example, the level of the output DC voltage of the DC voltage detecting circuit 12 is detected every zero-cross detection of the input AC voltage. When the detected level is at the L level, the output DC voltage of the converter circuit 2 exceeds 300 V. Therefore, the current commands IS0 to IS9 are reduced by only a predetermined percentage of the data IM0 to IM9. Moreover, the same processes as mentioned above are repeated until the detected level is set to the H level. The current commands IS0 to IS9 are reduced every zero-cross detection (shown in FIG. 4).

When the detected level is at the H level, since the output DC voltage of the converter circuit 2 is equal to lower than 300 V, the current commands IS0 to IS9 are reduced by only a predetermined percentage of the data IM0 to IM9. In addition, the same processes as mentioned above are repeated until the detected level is set to the L level. The current commands IS0 to IS9 are increased every zero-cross detection (shown in FIG. 4).

The current commands IS0 to IS9 obtained by the above processes are sequentially compared with the detection currents IR0 to IR9 of the current detecting circuit 11. On the basis of the comparison results, the ON percentage of the PWM signal to control the IGBT 2a is obtained [namely, D0 to D9 (Dn) shown in Table 1 are calculated]. For example, when ISn>IRn, data Dn in which the ON percentage is increased by only a predetermined value is obtained. When ISn<IRn, data Dn in which the ON percentage is increased by only the predetermined value is obtained.

The data D0 to D9 obtained as mentioned above are stored in the internal or external memory (for instance, internal RAM) of the microcomputer 13 and are patterned. The data D0 to D9 are sequentially set into a PWM timer of the microcomputer 13 at every predetermined time T synchronously with the zero-cross detection. Thus, the patterned PWM signal [shown in FIG. 2(c)] to control the IGBT 2a is outputted from a PWM output port by the PWM timer synchronously with the zero-cross detection. In response to the PWM signal, the IGBT driving circuit 14 on/off drives the IGBT 2a.

Explanation will be further made in detail with reference to FIG. 2. At the former half period of the input alternating current, the microcomputer 13 outputs the PWM signal [shown in FIG. 2(c)] to control the IGBT 2a from the PWM output port. In this instance, an input AC waveform is as shown in FIG. 2(a). The output current of the current detecting circuit 11 is as shown in a solid line in FIG. 2(d).

When the microcomputer 13 detects the zero-cross point, it detects the output current IRn of the current detecting circuit 11 at every predetermined time T and stores into the internal memory (RAM) and compares the stored current value and the current commands ISn in the internal memory.

As shown by a solid line in FIG. 2(d), for example, since a current waveform (input AC waveform) is distorted due to an influence by a power source impedance or the like, the current value is smaller than the current command for a period of time from a predetermined time T1 to T3. The current value is larger than the current command for a period of time from T5 to T9. The current value and current command are equal for a period of time of T0 an T4.

The microcomputer 13 raises the data D0 to D2 of the ON percentage of the PWM signal to control the IGBT 2a by only a predetermined value (5%) and reduces the data D4 to D8 by only a predetermined value (5%) at the next half period (latter half period) by the zero-cross detection [shown in FIG. 2(c)].

Thus, as shown by a solid line in FIG. 2(d), the output current of the current detecting circuit 11 has the same value as that of the current command, namely, the input current waveform can be set to the sine wave.

Figure 5A:
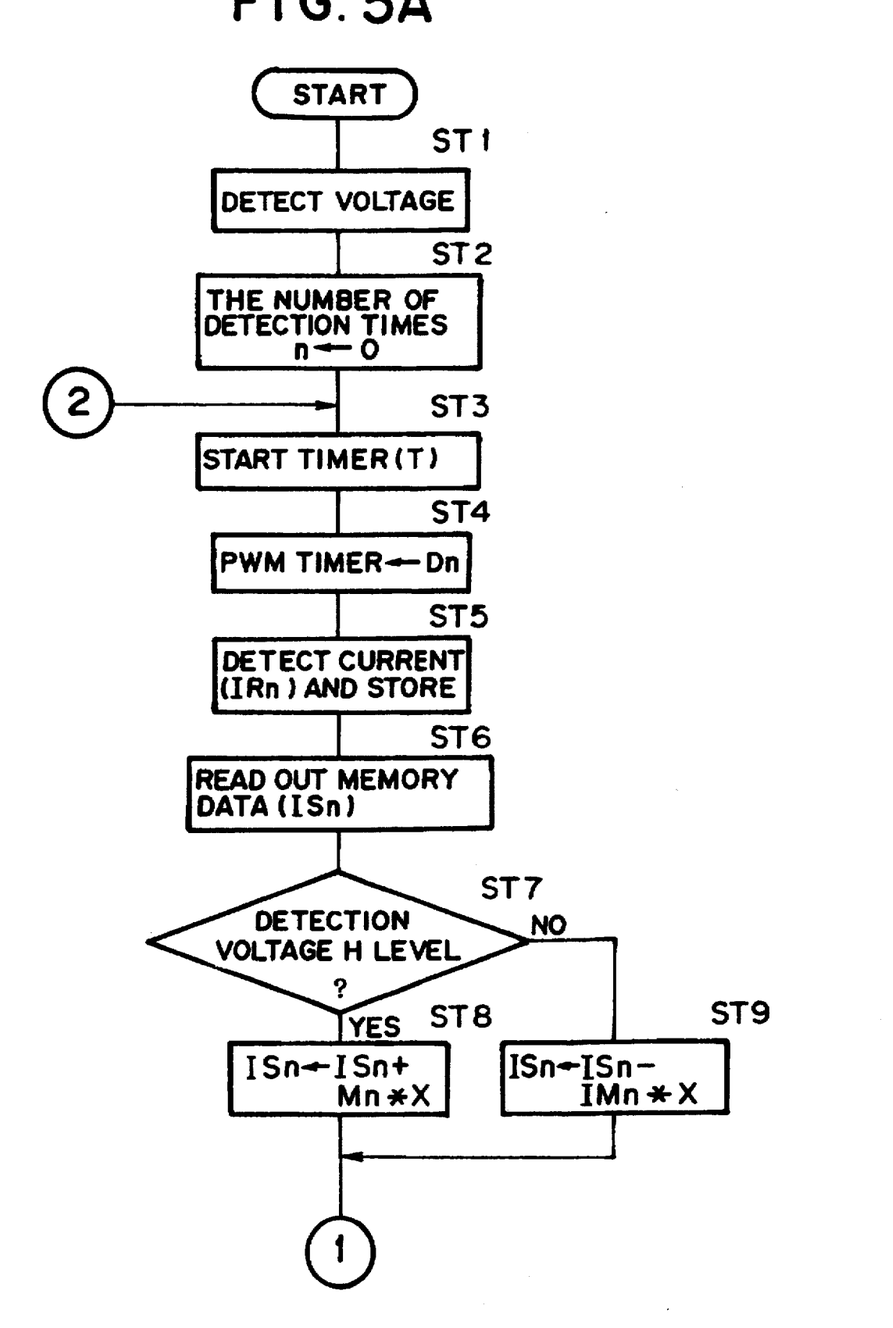
FIGS. 5A and 5B are flowcharts used for explaining the operation and control method of the control apparatus shown in FIG. 1.
Figure 5B:
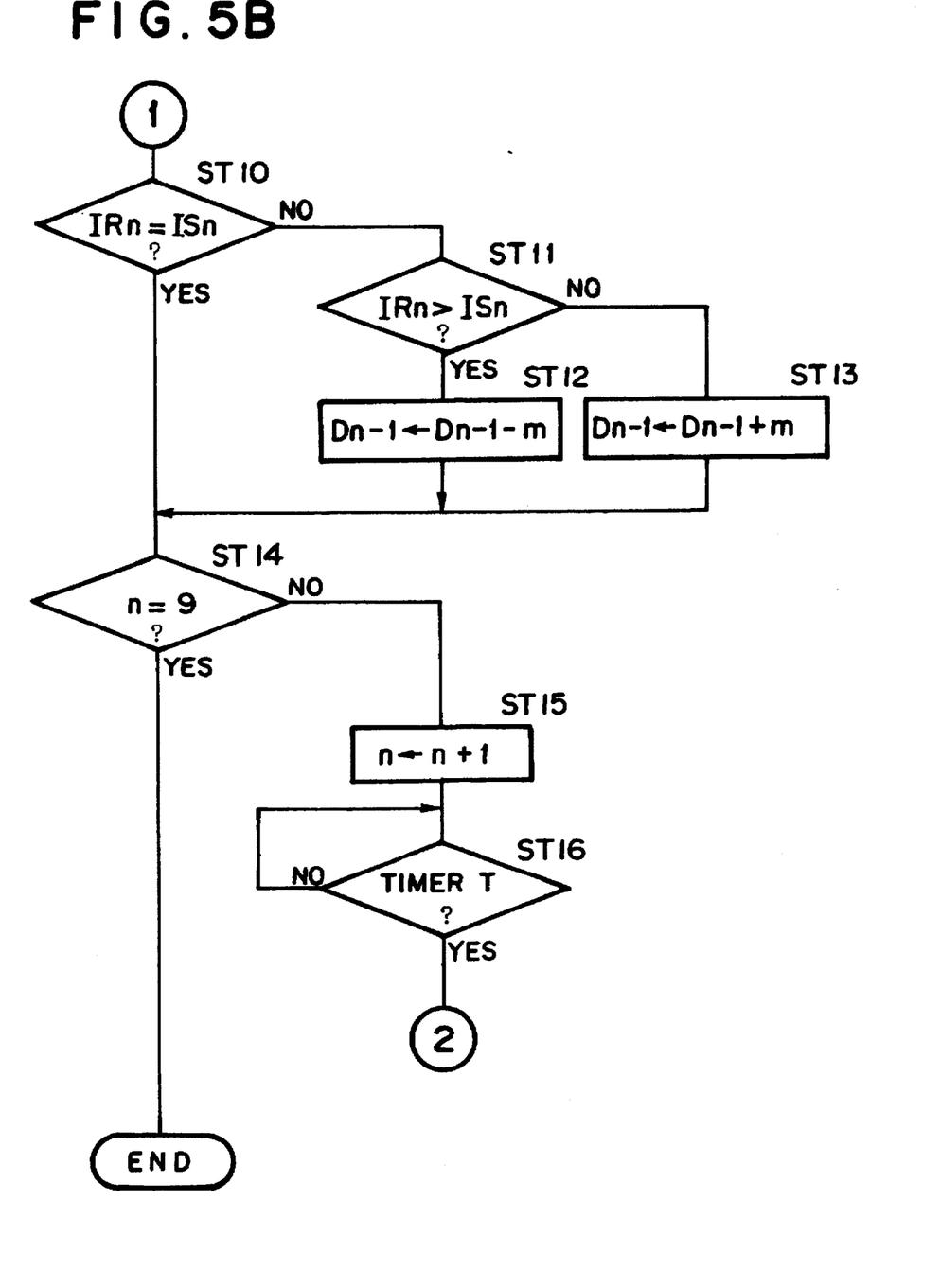

The processes of the microcomputer 13 are realized by processing routines shown in FIGS. 5A and 5B. The microcomputer 13 inputs the zero-cross detection signal and, when the zero-cross point of the input voltage waveform is detected, it executes the above routines.

Figure 6:
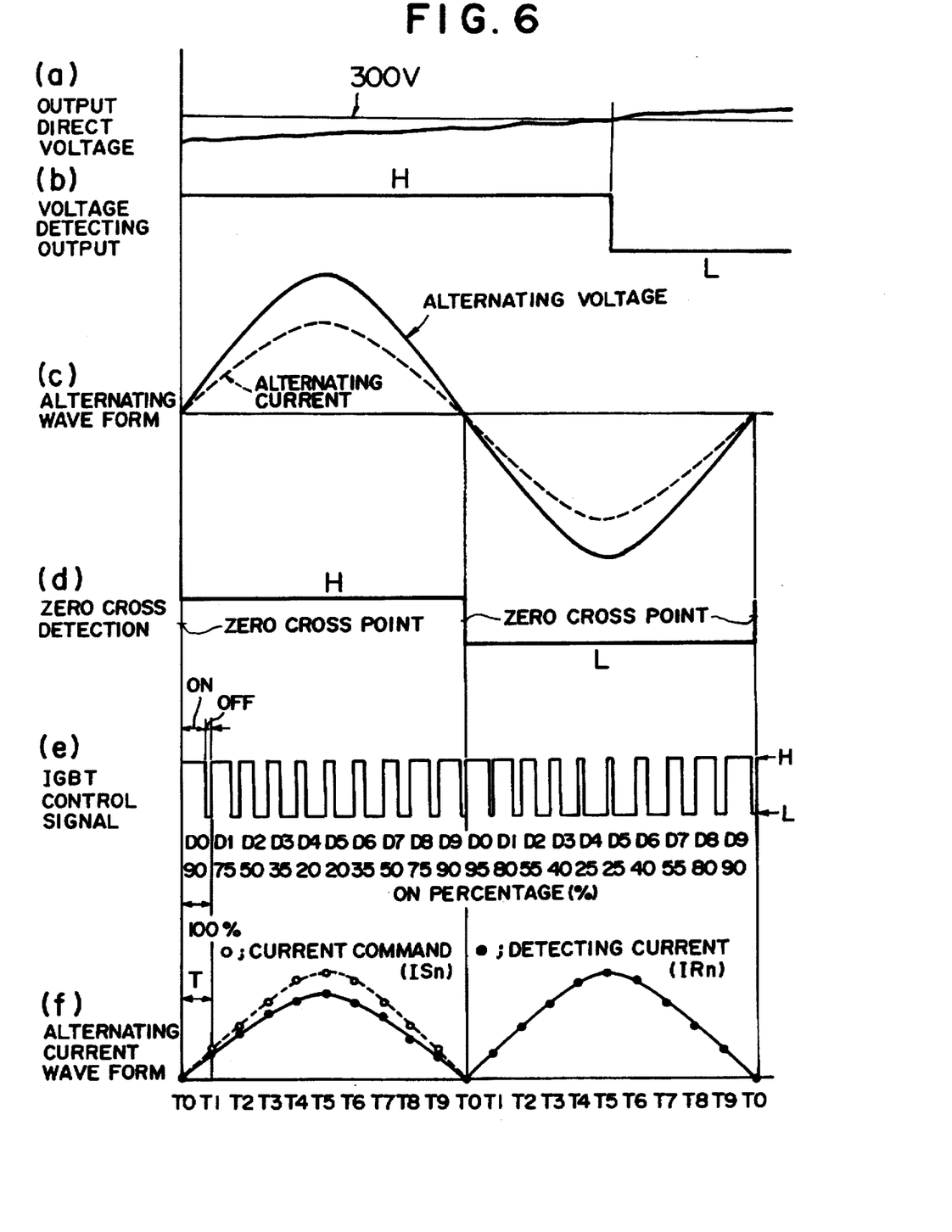
FIG. 6 is a timing chart used for explaining the operation and control method of the control apparatus shown in FIG. 1.

For example, as shown in FIG. 6(a), when the output DC voltage of the converter circuit 2 is equal to or lower than a predetermined value (300 V) because of a reason such that a load is heavy or the like, the output of the DC voltage detecting circuit 12 is set to the H level [shown in FIG. 6(b)].

Thus, the microcomputer 13 detects the H level (step ST1), sets the number (n) of detection times of the current detecting circuit 11 (step ST2), starts a timer of a predetermined time (T) (step ST3), and sets the data D0 of the internal memory into the internal PWM timer (step ST4). As already described above, the data Dn has been stored in the internal memory of the microcomputer 13 and is used to generate the PWM signal for controlling the IGBT 2a. By the setting of the PWM timer, the PWM timer is made operative. The PWM signal of the ON percentage according to the data D0 is outputted from the PWM output port of the microcomputer 13 to the IGBT driving circuit 14.

Subsequently, the output IR0 of the current detecting circuit 11 inputted to the analog input port is detected and stored (step ST5). The current command IS0 in the internal memory is read out and the current command is calculated (step ST6). In the calculation of the current command, since the output of the DC voltage detecting circuit 12 is at the H level, the processing routine advances from step ST7 to step ST8. In order to raise the current command, a predetermined percentage of the data IM0 shown in Table 1 is added to the current command IS0 which was read out. In the case where the output of the DC voltage detecting circuit 12 is at the L level, namely, when the output voltage of the converter circuit 2 exceeds 300 V, in the calculation of the current command, in order to reduce the current command, a predetermined percentage of the data IM0 shown in Table 1 is subtracted from the current command IS0 which was read out (step ST9).

Subsequently, the calculated current command IS0 is compared with the current IR0 which has already been detected and stored (step ST10). When IR0>IS0, the processing routine advances from step ST11 to step ST12. In order to reduce the ON percentage of the PWM signal, the data Dn-1 in Table 1 stored is reduced by only a predetermined value m. On the contrary, when IR0<IS0, the processing routine advances from step ST11 to step ST13 and the data Dn-1 in Table 1 stored is raised by only the predetermined value m in order to increase the ON percentage of the PWM signal. When n=0, n-1=9.

Subsequently, a check is made to see if the processes in the above steps have been repeated ten times or not (step ST14). Unless n=9, step ST15 follows and n is set to n+1. After the timer of the predetermined time T timed up, the processing routine is returned to step ST3 (step ST16). The same processes as mentioned above are repeated. The microcomputer 13 controls the inverter circuit 4 and input/output circuit 5 for the waiting time of the time-up.

The current commands ISn calculated at the half period of the input current waveform and the data Dn of the ON percentage are stored in the internal memory of the microcomputer 13 (stored in a form of Table 1). The current command ISn and ON percentage Dn can be also stored each time they are calculated. Therefore, in the next half period, the ON percentage of the PWM signal which is outputted is updated on the basis of the data Dn (refer to Table 1) in the internal memory at every predetermined time T.

As mentioned above, the outputs IR0 to IR9 of the current detecting circuit 11 are detected and stored. The current commands IS0 to IS9 are calculated on the basis of the data IS0 to IS9 (current commands in the former period) shown in Table 1, the output level of the DC voltage detecting circuit 12, and the data IM0 to IM9 shown in Table 1. The calculated current commands IS0 to IS9 are compared with the detected currents IR0 to IR9, thereby varying the data D0 to D9 of the ON percentage in the next half period.

In the case shown in FIG. 6, therefore, the output DC voltage of the converter circuit 2 is smaller than 300 V in the zero-cross detection and the output of the DC voltage detecting circuit 12 is at the H level, the current commands IS0 to IS9 are set to values shown by broken lines in FIG. 6(f). The current commands IS0 to IS9 are sequentially compared with the currents IR0 to IR9 in which the output of the current detecting circuit 11 was detected. According to the comparison results, since ISn IRn at each of the predetermined times T1 to T9, the data D0 to D8 of the ON percentage at the next half period are increased by only a predetermined value (5%) [shown in FIG. 6(e)].

Thus, as shown in FIG. 6(f), the current in which the output of the current detecting circuit 11 is the same as the current command at the former half period. Namely, while the waveform of the input alternating current is set to an almost sine wave, the output DC voltage of the converter circuit 2 is raised [shown in FIG. 6(a)]. Thus, the output DC voltage is controlled to a predetermined value.

Figure 7:
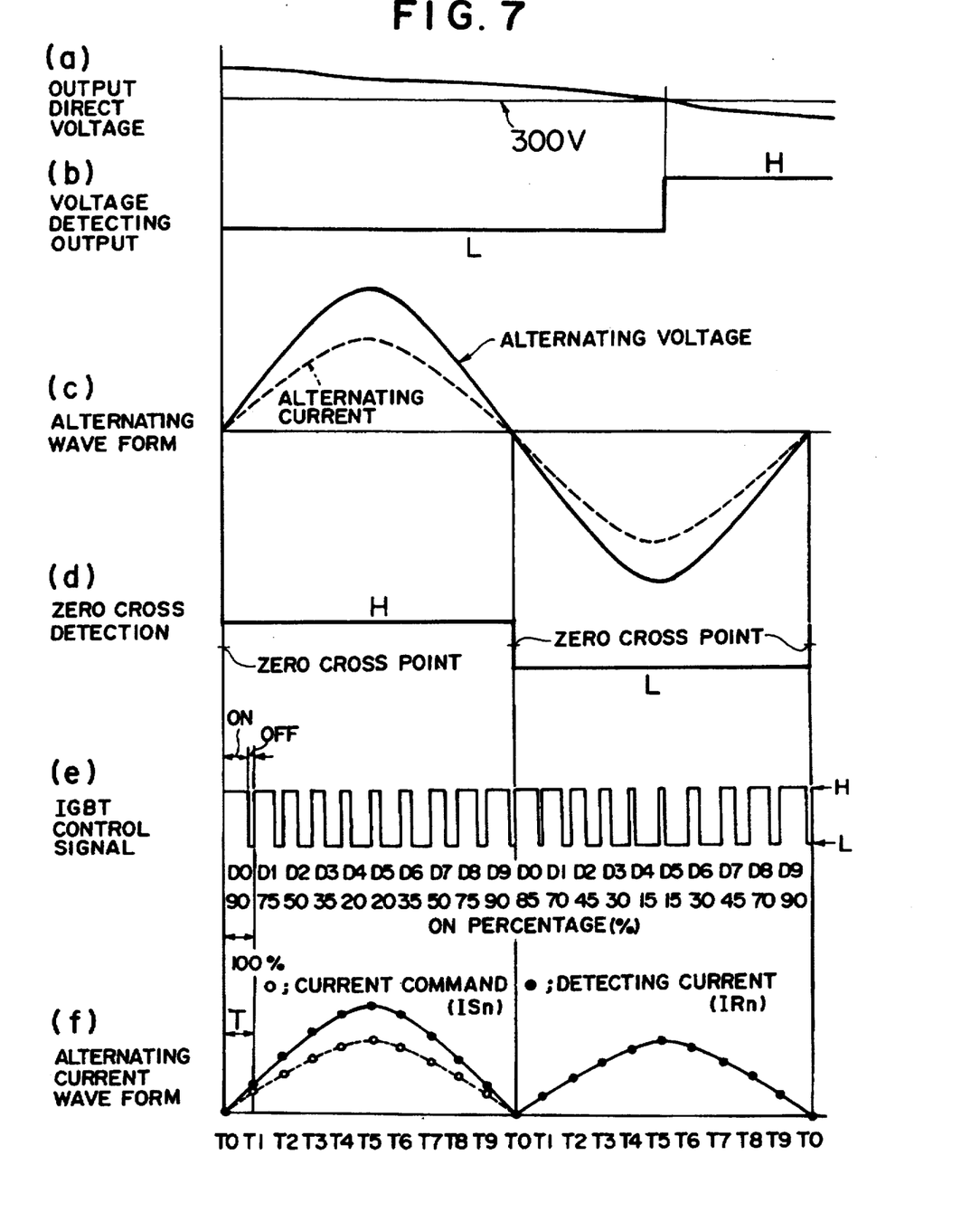
FIG. 7 is a timing chart used for explaining the operation and control method of the control apparatus shown in FIG. 1.

FIG. 7 shows an example in the case where the output DC voltage of the converter circuit 2 exceeds the predetermined value (300 V) because of a reason such that a load is light or the like. In this case, processes similar to those in the example shown in FIG. 6 are executed in accordance with the processing routines shown in FIGS. 5A and 5B. The detailed descriptions are omitted here. FIGS. 7(a) to 7(f) correspond to FIGS. 6(a) to 6(f).

In this case, since ISn <IRn for a period of time from the predetermined time T1 to T9, the data D0 to D8 of the ON percentage at the next half period are reduced by only a predetermined value (5%) [shown in FIG. 7(e)].

Thus, as shown in FIG. 7(f), the currents IRn in which the output of the current detecting circuit 11 at the latter half period coincide with the current commands ISn at the former half period, namely, the waveform of the input alternating current is almost set to the sine wave and the output DC voltage of the converter circuit 2 is reduced [shown in FIG. 7(a)].

As mentioned above, while the output DC voltage of the converter circuit 2 is detected at every zero-cross point (at every half period) of the input AC voltage, the current commands ISn are respectively increased or decreased by only a predetermined value by the detected voltage level. The input alternating currents IRn are detected at every predetermined time T. The detected currents IRn are compared with the current commands ISn. In accordance with the comparison results, the data Dn of the ON percentage of the PWM signal for controlling the IGBT (switching means) 2a of the converter circuit 2 is varied. The varied data Dn is set to the data at the next half period.

Therefore, since the above processes can be realized by a software, by merely adding simple circuits such as current detecting circuit 11 and DC voltage detecting circuit 12, the converter circuit 2 can be controlled by the microcomputer 13 for inverter controlling the compressor 3. Namely, the voltage detecting circuit for detecting the voltage waveform obtained by rectifying the AC voltage, oscillating circuit, exclusive-use IC for controlling the converter, and the like as in the conventional example are unnecessary. Thus, there is no need to use the converter control circuit 7 including those circuits. It is possible to control by the single microcomputer 13. Therefore, since the circuit construction is simplified, the number of parts can be reduced. The costs can be reduced and the reliability can be improved.

The input current can be almost set to the sine wave. A power factor can be improved. The harmonics current can be suppressed. The output DC voltage of the converter circuit 2 can be maintained to the predetermined value (300 V), so that there is no need to use parts of larger rated values than are needed in the control apparatus. Therefore, the costs can be also suppressed. Further, the output DC voltage of the converter circuit 2 doesn't abnormally increase and doesn't excessively decrease. Consequently, a breakage of the parts of the control apparatus can be prevented, the parts can be protected, and an erroneous operation of the inverter control can be prevented.

Although the number of data shown in the preferred embodiment has been set to ten (IR0 to IR9; IS0 to IS9; IM0 to IM9; D0 to D9), the invention is not limited such an example but it is better to use a larger number of data. In the preferred embodiment, although the ON percentage of the PWM signal has been updated at every half period, it is not limited to such a construction. For example, the ON percentage can be also updated at every period. Although ISn and Dn have been calculated each time the IRn are detected, the invention is not limited to such a case. For example, it is also possible to construct in a manner such that each time IRn are detected as shown in Table 1, they are stored and, after the data of the former half period was stored, they can be also sequentially calculated for the latter half period. Although the internal memory of the microcomputer has been used as a memory, the invention is not limited to such a memory but an external memory can be also used. Although the current command has been obtained by the calculation, the invention is not limited to such a case. It is also possible to previously store the current command into the memory and to selectively read out the current command and obtain it.

TABLE 1

| ROM | RAM | RAM | RAM |
| --- | --- | --- | --- |
| IM0 | D0 | IS0 | IR0 |
| IM1 | D1 | IS1 | IR1 |
| IM2 | D2 | IS2 | IR2 |
| IM3 | D3 | IS3 | IR3 |
| IM4 | D4 | IS4 | IR4 |
| IM5 | D5 | IS5 | IR5 |
| IM6 | D6 | IS6 | IR6 |
| IM7 | D7 | IS7 | IR7 |
| IM8 | D8 | IS8 | IR8 |
| IM9 | D9 | IS9 | IR9 |
| IMn | Dn | ISn | IRn |

I claim:

1. A control apparatus for controlling an air conditioner, comprising: a converter for converting an input AC supply power into a DC power, the converter having switching means for improving an input power factor of the air conditioner; an inverter for converting the DC power into an AC power and supplying the AC power to a compressor; a microcomputer for controlling the converter and the inverter; current detecting means for detecting an input current level of the AC supply power; voltage detecting means for detecting a voltage level of the DC power output of the converter; and DC voltage comparing means for comparing the detected DC voltage and a predetermined DC voltage; wherein the microcomputer includes current command calculation selecting means for obtaining a current command in accordance with a comparison result of the DC voltage comparing means, and switching control means for comparing the current command and the detected input current, obtaining an ON percentage of a PWM signal to control the switching means, and outputting the PWM signal to the switching means.

2. A control apparatus for an air conditioner according to claim 1; further comprising a memory for storing data; and wherein the current command calculation selecting means includes means for calculating the current command in accordance with data stored in the memory and the detection result of the DC voltage comparing means.

3. A control apparatus for an air conditioner according to claim 2; wherein the data comprises historical detected current data.

4. A control apparatus for controlling an air conditioner, comprising: a converter for converting an input AC supply power into a DC power, the converter having switching means for improving an input power factor of the air conditioner; an inverter for converting the DC power into an AC power and supplying the AC power to a compressor of the air conditioner; a microcomputer for controlling the converter and the inverter; current detecting means for detecting an input current level of the AC supply power; voltage detecting means for detecting a voltage level of the DC power output of the converter; DC voltage comparing means for comparing the detected DC voltage and a predetermined DC voltage; and zero-cross detecting means for detecting a zero-cross point of the AC supply power; wherein the microcomputer includes current command calculation selecting means for obtaining a current command corresponding to a detected input current level by controlling the current detecting means to detect an input current level at one or more predetermined time periods in an interval of at least a half period of the input current from said detected zero-cross point, storing the detected input current, and calculating the current command in accordance with previously stored input current data on the basis of a comparison result of the DC voltage comparing means, and switching control means for sequentially comparing the current command with the stored input currents, obtaining an ON percentage of a PWM signal to control the switching means, patterning the PWM signal, and outputting the patterned PWM signal synchronously with the detected zero-cross point to control the switching means.

5. A control apparatus for driving a motor, comprising: converting means for converting an AC input supply power into a DC power; inverter means for converting the DC voltage into a corrected AC signal for driving the motor; control means for controlling the inverter means and the converting means; current detecting means for detecting a current of the AC input supply power; voltage detecting means for detecting a voltage level of the DC power; DC voltage comparing means for comparing the detected DC voltage and a predetermined voltage level; current correction means for generating current correction data used for correcting the detected current in accordance with a comparison result of the DC voltage comparing means; switching means disposed in the converting means for improving a power factor of the motor; and switching control means for comparing the current correction data and the detected input current, determining the pulse width of respective pulses in a pulse width modulation signal, and outputting the pulse width modulation signal to control the switching means.

6. A control apparatus according to claim 5; further comprising zero-crossing detection means for detecting a zero-cross point of the AC input supply power; and wherein the current correction means includes means for calculating current correction data corresponding to a plurality of detected input current values by controlling the current detecting means to detect an input current at a plurality of predetermined time periods in a periodic interval comprising a percentage of the period of the AC input supply power from the zero-crossing point, storing the detected input current values, and calculating the current correction data in accordance with previously stored data on the basis of a comparison result of the DC voltage comparing means; and the switching control means includes means for sequentially comparing the current correction data with the stored input currents, determining a pulse width of respective pulses of a pulse width modulation signal in accordance with the comparison results, and outputting the pulse width modulation signal to the switching means synchronously with the detected zero-crossing point.

* * * * *